P. C. NESTOR.

THUMB TACK.

APPLICATION FILED DEC. 3, 1919.

Reissued Mar. 2, 1920.

14,810.

P. C. Nestor

Inventor

Witness

J. R. Tomlin

By C. A. Snow & Co.

Attorneys

UNITED STATES PATENT OFFICE.

PATRICK C. NESTOR, OF PHILADELPHIA, PENNSYLVANIA.

THUMB-TACK.

14,810. Specification of Reissued Letters Patent. Reissued Mar. 2, 1920.

Original No. 1,320,901, dated November 4, 1919, Serial No. 199,320, filed October 30, 1917. Application for reissue filed December 3, 1919. Serial No. 342,307.

*To all whom it may concern:*

Be it known that I, PATRICK C. NESTOR, a citizen of the United States, residing at Philadelphia, in the county of Philadelphia and State of Pennsylvania, have invented a new and useful Thumb-Tack, of which the following is a specification.

This invention relates to thumb tacks, one of its objects being to provide means whereby a thumb tack can be readily removed from the drawing board without the necessity of inserting a knife or the like under the tack and possibly mutilating the paper held in place by the tack.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings the preferred form of the invention has been shown.

In said drawings:—

Referring to the figures by characters of reference 1 designates the pointed stem of the tack, the same being provided with a dished or concave-convex head 2. Formed in this head at diametrically opposed points are slots 3 preferably eccentrically arranged as shown in Fig. 1.

It will be apparent that the thumb tack can be pressed into a board in the ordinary manner. When it is desired to remove it, it is merely necessary to insert the finger nails into the slots 3 and to pull upwardly. The nails will enter the head end above the board and a secure grip can be had upon the thumb tack thus to enable the user to readily remove it from the board.

Figure 1:
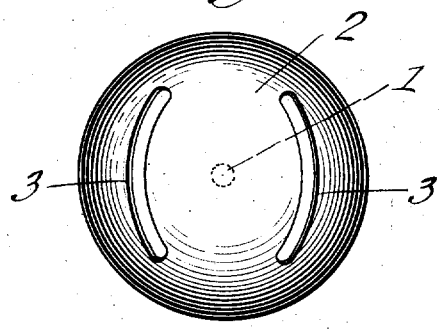
Figure 1 is a plan view of the thumb tack embodying the present improvements.
Figure 2:
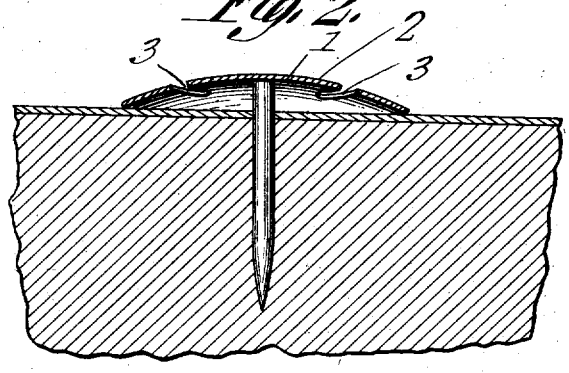
Fig. 2 is a central section therethrough.
Figure 3:
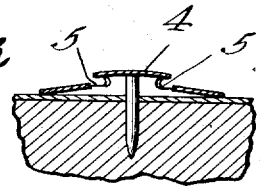
Fig. 3 is a view similar to Fig. 2 but showing a modified structure.

Instead of providing a head such as shown in Figs. 1 and 2 the head can be shaped as shown in Fig. 3 wherein the dished or concave-convex head is provided with a central raised portion forming a rounded annular shoulder 4 between the top and bottom of the head and the slots 5 are formed in this shoulder. With this arrangement it is easier to insert the nails of the fingers than with an arrangement such as shown in Figs. 1 and 2. However both forms can be used efficiently.

What is claimed is:

1. A thumb tack including a concavo-convex disk of uniform thickness provided with opposed arcuate slots, the opposed edges of that portion of the disk between the slots being convex from end to end and spaced above the plane occupied by the marginal portion of the disk, thereby to provide finger nail receiving spaces.

2. A thumb tack including a concavo-convex disk of uniform thickness provided with a central raised portion forming an annular shoulder, there being diametrically opposed arcuate slots within the shoulder for the reception of finger nails, the inner edges of the slots being eccentrically disposed relative to the disk and spaced from the plane occupied by the margin of the disk.

3. A thumb tack including a disk provided with opposed arcuate slots, the opposed edges of that portion of the disk between the slots being convex from end to end to provide finger nail engaging portions.

In testimony that I claim the foregoing as my own, I have hereto affixed my signature.

PATRICK C. NESTOR.